United States Patent [19]

Kobayashi et al.

[11] Patent Number: 4,814,153

[45] Date of Patent: Mar. 21, 1989

[54] METHOD OF CLEANING EXHAUST GASES

[75] Inventors: Motonobu Kobayashi, Himeji; Akira Inoue, Hirakata; Mitsuharu Hagi; Tsuyoshi Nagai, both of Hyogo; Hutoru Kinoshita, Himeji, all of Japan

[73] Assignee: Nippon Shokubai Kagaku Kogyo Co., Ltd., Osaka, Japan

[21] Appl. No.: 120,173

[22] Filed: Nov. 12, 1987

Related U.S. Application Data

[63] Continuation of Ser. No. 872,507, Jun. 10, 1986, abandoned.

[30] Foreign Application Priority Data

Jun. 10, 1985 [JP] Japan .................................. 60-124404

[51] Int. Cl.⁴ ............................................. B01D 53/36
[52] U.S. Cl. ................................................. 423/213.2
[58] Field of Search ..................................... 423/213.2

[56] References Cited

U.S. PATENT DOCUMENTS

| | | | |
|---|---|---|---|
| 4,018,706 | 4/1977 | Inoue et al. | 423/213.2 |
| 4,048,112 | 9/1977 | Matsushita et al. | 423/213.2 |
| 4,131,643 | 12/1978 | Utsunomiya et al. | 423/213.2 |
| 4,188,364 | 2/1980 | Gladden | 423/213.2 |
| 4,221,768 | 9/1980 | Inoue et al. | 423/213.2 |
| 4,282,115 | 8/1981 | Atsukawa et al. | 423/213.2 |

Primary Examiner—John Doll
Assistant Examiner—Jeffrey Edwin Russel
Attorney, Agent, or Firm—Sherman & Shalloway

[57] ABSTRACT

A method of cleaning an exhaust gas containing nitrogen oxides, carbon monoxide and an excess of molecular oxygen, which comprises passing the exhaust gas together with ammonia over a catalyst comprising (A) 60 to 99.9% by weight of a catalytic oxide composed of a titanium containing oxide, (B) 0.1 to 20% by weight of a catalytic oxide composed of at least one metal oxide selected from the group consisting of oxides of copper, manganese and chromium and (C) 0 to 20% by weight of a catalytic oxide composed of at least one metal oxides selected from the group consisting of oxides of vanadium, tungsten, molybdenum, cerium and tin at a temperature of 200° to 500° C.

10 Claims, No Drawings

METHOD OF CLEANING EXHAUST GASES

This application is a continuation of application Ser. No. 872,507 filed June 10, 1986, now abandoned.

This invention relates to a method of cleaning exhaust gases. In particular, this invention relates to a method of removing nitrogen oxides (to be referred to as NOx hereinafter) and carbon monoxide (to be referred to as CO) from exhaust gases generated from boilers, gas turbines, diesel engines, heating furnaces and various industrial processes. More specifically, this invention relates to a method of cleaning an exhaust gas containing an excess of molecular oxygen by removing NOx and CO from the exhaust gas by catalytic reaction in the presence of ammonia to render it non-toxic or non-polluting.

Presently, a wet method, a dry adsorption method using an adsorbent and a dry catalytic oxidation (reduction) method using a catalyst are mainly available for the removal of NOx and CO from exhaust gases. The catalytic oxidation (reduction) method is considered to be advantageous both technically and economically since it enables a large amount of exhaust gases to be treated and does not require a waste liquor treating operation.

For example, NOx, CO and HC (hydrocarbons) contained in an exhaust gas from an internal combustion engine such as an automobile engine are most effectively removed when the internal combustion engine is operated in a reducing atmosphere at an air-fuel ratio near the stoichiometrically equivalent point (A/F). Hence, much work has been done on catalysts which would efficiently remove NOx, CO and HC under these conditions, and resulted in the development of numerous catalysts comprising noble metals such as platinum (Pt), palladium (Pd) and rhodium (Rh).

It is known, however, that when NOx is to be removed from an exhaust gas having an excess of oxygen as indicated by an oxygen concentration of 4 to 15%, such as an exhaust gas from a gas turbine power generation, CO in the exhaust gas which acts as a reducing agent is consumed by oxidation and the desired efficiency of removing NOx is inevitably decreased; and therefore that it is very difficult to remove NOx and CO simultaneously.

For the foregoing reason, a selective reductive denitration method using ammonia ($NH_3$) as a reducing agent has been regarded as an effective method for the removal of NOx in an oxidizing atmosphere because $NH_3$ and NOx react selectively even in an oxidizing atmosphere without the influence of oxygen in the exhaust gas, and therefore the amount of the reducing agent used can be small.

In the simultaneous reduction of NOx and oxidation of CO in the presence of $NH_3$, it is desirable to use a catalyst having strong oxidizing ability in order to improve the oxidation activity of CO. On the other hand, if its oxidation ability is too strong, $NH_3$ is oxidized or decomposed so that the efficiency of removing NOx tends to be drastically reduced. No satisfactory catalyst has been developed to date which can remove NOx and CO simultaneously with good efficiency.

It is an object of this invention to overcome the difficulties of the prior art by providing a method which can be operated stably and efficiently over long periods of time in the removal of NOx and CO from an exhaust gas having an excess of molecular oxygen by catalytic reaction in the presence of $NH_3$.

According to this invention, the above object is achieved by a method of cleaning an exhaust gas containing nitrogen oxides, carbon monoxide and an excess of molecular oxygen, which comprises passing the exhaust gas together with ammonia over a catalyst comprising (A) 60 to 99.9% by weight of a catalytic oxide composed of a titanium containing oxide, (B) 0.1 to 20% by weight of a catalytic oxide composed of at least one metal oxide selected from the group consisting of oxides of copper, manganese and chromium and (C) 0 to 20% by weight of a catalytic oxide composed of at least one metal oxide selected from the group consisting of oxides of vanadium, tungsten, molybdenum, cerium and tin at a temperature of 200° to 500° C., preferably after passing the exhaust gas together with ammonia over an ordinary NOx removing catalyst at a temperature of 200° to 500° C.

The catalyst used in this invention for removing NOx and CO simultaneously comprises a catalytic oxide (A) which is a titanium-containing oxide, a catalytic oxide (B) which is an oxide of at least one metal selected from the group consisting of copper, manganese and chromium and if desired a catalytic oxide (C) which is an oxide of at least one metal selected from the group consisting of vanadium, tungsten, molybdenum, cerium and tin. This catalyst enables reduction of NOx with $NH_3$ and oxidation of CO by oxygen at temperatures within a broad range and at high conversions. Since the unreacted ammonia ($NH_3$) is decomposed to nitrogen ($N_2$) on the catalyst, the amount of the unreacted $NH_3$ remaining in the treated gas is very small. Accordingly, the catalyst used in this invention is superior in that it hardly causes secondary air pollution by discharging $NH_3$.

The catalytic oxide (A) may be any titanium-containing oxide, and examples include titanium dioxide (to be referred to as $TiO_2$), binary compound oxides comprising titanium and silicon (to be referred to as $TiO_2—SiO_2$) and tertiary compound oxides comprising titanium, silicon and zirconium (to be referred to as $TiO_2—SiO_2—ZrO_2$). A catalyst in accordance with this invention comprising $TiO_2—SiO_2$ or $TiO_2—SiO_2—ZrO_2$ as the catalytic oxide (A) has excellent heat resistance and is free from thermal degradation by sintering, etc. because $TiO_2—SiO_2$ and $TiO_2—SiO_2—ZrO_2$ have a high surface area and the active components, i.e. the catalytic oxide (B) and catalytic oxide (C), can be highly dispersed and maintained in the highly dispersed state over a long period of time in use.

The catalytic oxide (A) preferably has a specific surface area of at least 5 $m^2/g$, particularly at least 10 $m^2/g$.

The catalyst used in this invention comprises, as oxides, 60 to 99.9% by weight, preferably 70 to 99.5% by weight, of the catalytic oxide (A), 0.1 to 20% by weight, preferably 0.5 to 15% by weight, of the catalytic oxide (B) and 0 to 20% by weight, preferably 0 to 15% by weight, of the catalytic oxide (C). If the proportion of the catalytic oxide (B) exceeds 20% by weight, decomposition of $NH_3$ is accelerated at temperatures higher than 400° C., and the efficiency of NOx removal is undesirably reduced. If the proportion of the catalytic oxide (B) is less than 0.1% by weight, the ability of the catalyst to remove CO is reduced undesirably. If the proportion of the catalytic oxide (C) exceeds 20% by weight, the cost of materials for the catalyst increases. Hence, it is desirably not more than 20% by weight.

Some methods which can be used to prepare the catalyst of this invention are described below. It should be understood that the invention is not limited to these specific methods of catalyst preparation.

An aqueous solution containing active ingredients such as vanadium and copper or a powder of active ingredients as oxides is added to a titanium-containing oxide such as $TiO_2$, $TiO_2$—$SiO_2$ and $TiO_2$—$SiO_2$—$ZrO_2$ together with a molding aid, and they are mixed and kneaded while adding a suitable amount of water. The mixture is then molded into a honeycomb structure by an extrusion molding machine. The molded product is dried at 50° to 120° C., and then calcined in air at 400° to 600° C., preferably 430° to 550° C., for 1 to 10 hours, preferably 2 to 6 hours, to give a finished catalyst. As an alternative method, a powder of $TiO_2$, $TiO_2$—$SiO_2$ or $TiO_2$—$SiO_2$—$ZrO_2$, for example, is molded into a honeycomb structure, and the resulting honeycomb product is impregnated with an aqueous solution of active ingredients such as vanadium and copper to deposit them. There may also be employed a method which comprises depositing a slurry containing the aforesaid catalytically active ingredients on a honeycomb carrier molded from alumina, silica, silica-alumina, bentonite, diatomaceous earth, silicon carbide, titania, zirconia, magnesia, cordierite, mullite, pumice, inorganic fibers, etc. at a rate of 50 to 300 g/liter-carrier as oxides.

The shape of the catalyst may include not only a honecomb, but also a solid cylinder, a hollow cylinder, a plate, a ribbon, a corrugated plate, a pipe, a doughnut, a lattice and other unitary structures.

The titanium material for the preparation of the catalyst used in this invention may be selected from inorganic titanium compounds such as titanium chloride, titanium sulfate and titanium hydroxide and organic titanium compounds such as titanium oxalate and tetraisopropyl titanate. A source of silicon for the preparation of $TiO_2$—$SiO_2$ and $TiO_2$—$SiO_2$—$ZrO_2$ may be selected from inorganic silicon compounds such as colloidal silica, water glass and silicon tetrachloride and organic silicon compounds such as ethyl silicate. A source of zirconium may be selected from inorganic zirconium compounds such as zirconium chloride, zirconium oxychloride, zirconium sulfate, zirconium oxysulfate and zirconium nitrate, and organic zirconium compounds such as zirconium oxalate and tetraisopropyl zirconate. Starting materials for the catalytic oxide (B) and the catalytic oxide (C) may be properly chosen from oxides, hydroxides, inorganic salts and organic salts, particularly ammonium salts, oxalate salts, sulfate salts and halides.

In one preferred embodiment of this invention, an exhaust gas containing nitrogen oxides, carbon monooxide and an excess of molecular oxygen is passed over an NOx removing catalyst together with ammonia at a temperature of 200° to 500° C. whereby 30 to 90%, particularly 40 to 80%, of NOx is reduced, and thereafter the exhaust gas as such is passed over the catalyst described hereinabove at a temprature of 200° to 500° C. to remove the unreacted NOx and CO contained in it.

Generally, the reaction rate constant in a reaction of reducing NO with ammonia as a reducing agent is linear to the concentration of NO. If, therefore, the space velocity (SV) is decreased to one-half, the reaction velocity constant is doubled and the efficiency of NOx removal accordingly increases. Investigations of the present inventors have shown, however, that when such a catalyst for removing NOx and CO simultaneously is used, decomposition of ammonia is liable to occur in addition to the reaction of NOx and ammonia as the SV is decreased, and that consequently, even when SV is decreased, the efficiency of NOx removal is not increased as expected unlike an ordinary NOx removing catalyst. Accordingly, in a method of removing NOx and CO in the presence of ammonia, a higher efficiency of NOx removal can be obtained by using an NOx removing catalyst which scarcely decomposes ammonia and a catalyst for simultaneously removing NOx and CO in stacked layers than by increasing the amount of the catalyst for simultaneously removing NOx and CO.

Hence, the above preferred embodiment of the invention will be suitable for an exhaust gas cleaning process which particularly requires both a high CO removal efficiency and a very high NOx removal efficiency.

The NOx removing catalyst used in the above method is not particularly limited in its active ingredients. Preferably, it is a catalyst comprising 50 to 99.5% by weight, preferably 60 to 99% by weight, of a catalytic oxide (a) composed of a titanium-containing oxide, and 0.5 to 50% by weight, preferably 1 to 40% by weight, of a catalytic oxide (b) composed of an oxide of at least one element selected from the group consisting of vanadium, tungsten, molybdenum and tin.

The above method is carried out, for example, by filling the NOx removing catalyst and the NOx-CO removing catalyst in the form of a honeycomb or a pipe into cassettes of a suitable size, placing the NOx removing catalyst cassette at an inlet for a gas to be treated and the NOx-CO removing catalyst cassette downstream of it, introducing an exhaust gas together with ammonia into a reactor at a temperature of 200° to 500° C. to bring them into contact with the catalysts.

The exhaust gas to be treated by the method of this invention usually contains 10 to 1,000 ppm of NOx (mainly NO), 10 to 10,000 ppm of CO, 0 to 1,000 ppm of SOx, 1 to 20% by volume of oxygen, 1 to 15% by volume of carbon dioxide gas, 5 to 20% by volume of steam and 0 to 20 $g/Nm^3$ of soot. Its composition should not particularly be limited.

When the exhaust gas contains oxygen-containing organic compounds such as aldehydes which are a malodorous component, the use of the catalyst in accordance with this invention can completely oxidize these oxygen-containing compounds and render them non-polluting.

The conditions for treating the exhaust gas in accordance with the method of this invention can be varied properly according to the type and characteristics of the exhaust gas. The amount of ammonia added is preferably 0.5 to 3 parts per part of NOx.

The reaction temperature is 200° to 500° C., preferably 250° to 450° C., and the space velocity is 1,000 to 100,000 $hr^{-1}$, preferably 2,000 to 30,000 $hr^{-1}$ (STP). There is no particular restriction on the reaction pressure, and it is preferably 0.01 to 10 $kg/cm^2$.

The following Examples and Comparative Examples illustrate the present invention in greater detail. The invention, however, should not be limited to these examples alone.

EXAMPLE 1

A compound oxide ($TiO_2$—$SiO_2$) comprising titanium and silicon was prepared by the method to be described. A solution of titanyl sulfate in sulfuric acid and water containing 250 g/liter, as $TiO_2$, of $TiOSO_4$ and 1,100 g/liter (total) of $H_2SO_4$ was used as a source of titanium.

Separately, 286 liters of aqueous ammonia (25% $NH_3$) was added to 400 liters of water and 24 kg of Snowtex-NCS-30 (silica sol made by Nissan Chemical Co., Ltd.; about 30% by weight as $SiO_2$) was added. To the resulting solution was gradually added with stirring 153 liters of the above sulfuric acid-water solution of titanyl sulfate diluted with 300 liters of water to form a co-precipitated gel. The mixture was allowed to stand for 15 hours. The resulting $TiO_2$—$SiO_2$ gel was collected by filtration, washed with water, and then dried at 200° C. for 10 hours.

The dried product was then calcined in air at 550° C. for 6 hours. The resulting powder had a Ti:Si atomic ratio of 4:1 and a BET surface area of 180 m²/g The resulting powder was designated as TS-1, and a catalyst was prepared by the following method using this powder TS-1.

Monoethanolamine (0.7 liter) was mixed with 7 liters of water, and 0.426 kg of ammonium metavanadate was dissolved in the mixture to form a uniform solution. The solution was added to 16 kg of TS-1, and thoroughly mixed and kneaded with starch (molding aid) and 0.333 kg of copper oxide (CuO) powder while adding a suitable amount of water. The mixture was molded into a lattice form with an outside section 80 mm square, an opening size of 4.0 mm, a wall thickness of 1.0 mm and a length of 400 mm by an extrusion molding machine. The molded product was dried at 80° C. and calcined in an air atmosphere at 450° C. for 5 hours.

The finished catalyst had the following oxide weight ratio: TS-1:CuO:$V_2O_5$=96:2:2.

EXAMPLE 2

A powder composed of titanium oxide was prepared as in Example 1 without using Snowtex NCS-30. The resulting powder had a surface area of 61 m²/g. A lattice form catalyst was prepared as in Example 1 using the titanium oxide.

The resulting finished catalyst had the following oxide weight ratio: $TiO_2$:CuO:$V_2O_5$=96:2:2.

EXAMPLE 3

A titania-silica-zirconia composition was prepared in the same way as in Example 1 except that 153 liters of the same sulfuric acid-water solution of titanium sulfate as used in Exmaple 1, 9.07 kg of zirconium oxychloride ($ZrOCl_2.8H_2O$), and 16.89 kg of Snowtex-NCS-30 were used. The resulting composition had the following oxide ratio: $TiO_2$:$SiO_2$:$ZrO_2$=80:15:5. It had a BET specific surface area of 180 m²/g. The resulting powder was designated as TSZ-1. A lattice form catalyst having the same composition as in Example 1 (TSZ-1:$V_2O_5$:CuO=96:2:2) was prepared by using TSZ-1 as an Example 1.

COMPARATIVE EXAMPLE 1

A lattice form catalyst was prepared as in Example 1 except that 0.375 kg of ammonium para-tungstate was used and copper oxide was not used.

The finished catalyst had the following oxide weight ratio: TS-1:$V_2O_5$:$WO_3$=96:2:2.

COMPARATIVE EXAMPLE 2

A honeycomb molded structure ($TiO_2$—$SiO_2$) composed only of TS-1 was prepared by the method of Example 1.

An article having 5×5 cells (25 mm square, opening size 4.0 mm, well thickness 1.0 mm) and a length of 300 mm was cut out from the molded structure. The cut article was immersed in 0.4 liter of an aqueous solution of palladium nitrate in an amount of 2.8g as palladium (Pd). The article was taken out and the remaining solution on it was separated by filtration. The article was then dried at 100° C. and then calcined at 450° C. for 5 hours in air.

The resulting catalyst had the composition: TS-1:Pd=99.71:0.29 (weight ratio).

EXAMPLE 4

The catalysts prepared in Examples 1 to 3 and Comparative Examples 1 and 2 were tested by the following method for NOx and CO removal efficiencies.

An article having 5×5 cells (25 mm square) and a length of 300 mm was cut out from the lattice form catalyst (opening size 4.0 mm, thickness 1.0 mm) and filled in a stainless steel reaction tube having an inside diameter of 38 mm and immersed in a molten salt bath. A synthetic gas being similar to a gas turbine exhaust gas and having the following gas composition was introduced into only the pores of the catalyst layer at a flow rate of 1.875 N m³/hr (space velocity 10,000 hr$^{-1}$) while adding 200 ppm of ammonia, and the NOx removal efficiency and CO removal efficiency at a reaction temperature of 250° to 450° C. were determined.

| Gas composition | |
|---|---|
| NO | 100 ppm |
| CO | 500 ppm |
| $O_2$ | 15% by volume |
| $CO_2$ | 10% by volume |
| $H_2O$ | about 10% by volume |
| $N_2$ | remainder |

The NOx and CO removal efficiencies were determined by measuring the NOx concentration and CO concentration at the inlet and outlet of the catalyst layer by an NOx meter (Chemically luminescent type; ECL-7S made by Yanagimoto Seisakusho) and gas chromatography (GC-9A made by Shimazu Seisakusho) and calculating the NOx and CO removal efficiencies in accordance with the following equations.

NOx removal efficiency (%) =

$$\frac{\left(\begin{array}{c}\text{Concentration of}\\\text{NOx at the inlet}\end{array}\right) - \left(\begin{array}{c}\text{Concentration of}\\\text{NOx at the outlet}\end{array}\right)}{(\text{Concentration of NOx at the inlet})} \times 100$$

CO removal efficiency (%) =

$$\frac{\left(\begin{array}{c}\text{Concentration of}\\\text{CO at the inlet}\end{array}\right) - \left(\begin{array}{c}\text{Concentration of}\\\text{CO at the outlet}\end{array}\right)}{(\text{Concentration of CO at the inlet})} \times 100$$

The results are shown in Table 1.

TABLE 1

| Catalyst | Removal Efficiency (%) | Temperature (°C.) | | | | |
|---|---|---|---|---|---|---|
| | | 250 | 300 | 350 | 400 | 450 |
| Example 1 | NOx | 70 | 83 | 88 | 86 | 76 |
| | CO | 30 | 51 | 73 | 87 | 92 |
| Example 2 | NOx | 65 | 82 | 87 | 85 | 75 |

TABLE 1-continued

| Catalyst | Removal Efficiency (%) | Temperature (°C.) | | | | |
|---|---|---|---|---|---|---|
| | | 250 | 300 | 350 | 400 | 450 |
| Example 3 | CO | 29 | 50 | 71 | 86 | 92 |
| | NOx | 70 | 83 | 88 | 86 | 77 |
| | CO | 31 | 51 | 72 | 87 | 91 |
| Comp. Example 1 | NOx | 65 | 81 | 89 | 91 | 88 |
| | CO | 0 | 0 | 0 | 0 | 0 |
| Comp. Example 2 | NOx | 28 | 21 | 10 | 4 | 3 |
| | CO | 99 | 100 | 100 | 100 | 100 |

The results clearly demonstrate that the catalysts in accordance with this invention can simultaneously remove NOx and CO with good efficiencies, and show better performance than the catalysts in Comparative Examples.

The NOx and CO removal efficiencies of the catalyst were determined by the method described in Example 4.

EXAMPLES 6-20

Catalysts were prepared as in Example 5 except that the catalytic oxide (B) and the catalytic oxide (C) were changed.

Catalyst sources were ammonium salts for vanadium, tungsten and molybdenum, nitrates for copper, chromium, manganese and cerium, and a sulfate for tin.

The reaction was carried out as in Example 4. The catalyst compositions and the results are shown in Table 2.

As shown in Table 2, the catalysts of this invention show excellent NOx and CO removal efficiencies, and could be used over a wide temperature range.

TABLE 2

| Example | Catalyst composition (weight ratio) | Removal Efficiency (%) | Temperature (°C.) | | | | |
|---|---|---|---|---|---|---|---|
| | | | 250 | 300 | 350 | 400 | 450 |
| 5 | TS-1:CuO:$V_2O_5$ = 96:2:2 | NOx | 71 | 83 | 88 | 86 | 75 |
| | | CO | 31 | 52 | 73 | 87 | 92 |
| 6 | TS-1:CuO:$V_2O_5$ = 93:2:5 | NOx | 81 | 88 | 91 | 89 | 71 |
| | | CO | 43 | 73 | 92 | 98 | 100 |
| 7 | TS-1:CuO:$V_2O_5$:$WO_3$ = 86:2:7:5 | NOx | 85 | 91 | 92 | 90 | 68 |
| | | CO | 45 | 75 | 94 | 99 | 100 |
| 8 | TS-1:CuO = 95:5 | NOx | 65 | 81 | 81 | 74 | 51 |
| | | CO | 81 | 91 | 95 | 99 | 100 |
| 9 | TS-1:CuO:$WO_3$ = 91:2:7 | NOx | 64 | 76 | 87 | 87 | 81 |
| | | CO | 30 | 50 | 72 | 87 | 92 |
| 10 | TS-1:CuO:$MoO_3$ = 91:2:7 | NOx | 63 | 75 | 87 | 87 | 80 |
| | | CO | 29 | 51 | 71 | 88 | 90 |
| 11 | TS-1:CuO:$SnO_2$ = 91:2:7 | NOx | 61 | 73 | 87 | 87 | 82 |
| | | CO | 27 | 50 | 70 | 88 | 90 |
| 12 | TS-1:$Cr_2O_3$:$V_2O_5$ = 91:2:7 | NOx | 72 | 84 | 89 | 86 | 74 |
| | | CO | — | 21 | 41 | 68 | 80 |
| 13 | TS-1:$Cr_2O_3$:$WO_3$ = 91:2:7 | NOx | 73 | 86 | 90 | 87 | 67 |
| | | CO | — | 12 | 35 | 61 | 76 |
| 14 | TS-1:$Cr_2O_3$:$MoO_3$ = 91:2:7 | NOx | 62 | 76 | 88 | 86 | 82 |
| | | CO | — | 16 | 41 | 63 | 76 |
| 15 | TS-1:$Cr_2O_3$:$SnO_2$ = 91:2:7 | NOx | 60 | 75 | 87 | 87 | 82 |
| | | CO | — | 15 | 40 | 61 | 74 |
| 16 | TS-1:$MnO_2$:$V_2O_5$ = 91:2:7 | NOx | 82 | 91 | 92 | 91 | 88 |
| | | CO | — | 15 | 40 | 62 | 66 |
| 17 | TS-1:$MnO_2$:$WO_3$ = 91:2:7 | NOx | 63 | 77 | 89 | 87 | 81 |
| | | CO | — | 15 | 40 | 63 | 66 |
| 18 | TS-1:$MnO_2$:$MoO_3$ = 91:2:7 | NOx | 62 | 76 | 88 | 87 | 80 |
| | | CO | — | 14 | 39 | 62 | 65 |
| 19 | TS-1:$MnO_2$:$SnO_2$ = 91:2:7 | NOx | 60 | 75 | 87 | 86 | 82 |
| | | CO | — | 11 | 39 | 60 | 64 |
| 20 | TS-1:CuO:$CeO_2$ = 91:2:7 | NOx | 65 | 77 | 88 | 87 | 81 |
| | | CO | 31 | 50 | 72 | 87 | 91 |

EXAMPLE 5

The same honeycomb molded article (5×5 cells (25 mm square), opening size 4.0 mm, thickness 1.0 mm, length 300 mm) composed of TS-1 as used in Comparative Example 2 was immersed for 5 minutes in 0.4 liter of an aqueous solution obtained by dissolving 73.7 g of copper nitrate [$Cu(NO_3)_2 \cdot 6H_2O$] in water. The honeycomb molded article was taken up, then dried, and calcined at 450° C. for 3 hours in air to deposit copper oxide (CuO).

The copper oxide-deposited article was immersed for 5 minutes in 0.4 liter of an aqueous solution obtained by dissolving 25.4 g of ammonium metavanadate ($NH_4VO_3$) and 30.4 g of oxalic acid in water. The article was taken out and then dried and calcined at 450° C. for 3 hours in air.

The finished catalyst had the composition: TS-1:CuO:$V_2O_5$=96:2:2.

EXAMPLE 21

An NOx removing catalyst having a TS-1:$V_2O_5$:$WO_3$ weight ratio of 90:5:5 was prepared in accordance with the method described in Example 1.

The catalyst obtained in Example 6 and the NOx removing catalyst prepared above were cut into a 5×5 cells (25 mm square), opening size 4.0 mm, thickness 1.0 mm) and a length of 150 mm. The NOx catalyst was placed at the gas inlet of the catalyst layer, and the catalyst of Example 6 was placed downwardly of it. A synthetic gas containing $NH_3$ was introduced into the catalyst layer in accordance with Example 4, and the NOx and CO removal efficiencies were determined. The results are shown in Table 3.

EXAMPLES 22-24

NOx and CO removal efficiencies were determined in accordance with Example 21 using the NOx removing catalyst used in Example 21 and the catalyst of Example 6 with varying lengths. The results are shown in Table 3.

EXAMPLE 25

Example 6 was repeated except that the length of the catalyst was changed to 450 mm. The NOx and CO removal efficiencies were determined, and the results are shown in Table 3.

EXAMPLES 26–31

CO and NOx removal efficiencies were determined in accordance with Example 21 using a denitrating catalyst (first stage) and a CO-NOx removing catalsyt (second stage) having different compositions. The results are shown in Table 4.

TABLE 3

| | Length of the catalyst (mm) | | | Temperature (°C.) | | | | |
|---|---|---|---|---|---|---|---|---|
| Example | 1st stage NOx removing catalyst | 2nd stage CO—NOx removing catalyst | Removal efficiency (%) | 250 | 300 | 350 | 400 | 450 |
| Example 21 | 150 | 150 | NOx | 81 | 90 | 94 | 94 | 89 |
| | | | CO | 24 | 48 | 71 | 85 | 90 |
| | | | (NOx removal ratio after the 1st stage) | (57) | (70) | (79) | (74) | (72) |
| Example 22 | 100 | 200 | NOx | 81 | 89 | 93 | 92 | 86 |
| | | | CO | 30 | 58 | 80 | 91 | 94 |
| | | | (NOx removal ratio after the 1st stage) | (43) | (55) | (59) | (59) | (58) |
| Example 23 | 200 | 100 | NOx | 81 | 91 | 94 | 94 | 90 |
| | | | CO | 16 | 35 | 56 | 72 | 78 |
| | | | (NOx removal ratio after the 1st stage) | (67) | (79) | (83) | (83) | (81) |
| Example 24 | 250 | 200 | NOx | 90 | 94 | 97 | 96 | 93 |
| | | | CO | 30 | 58 | 80 | 91 | 94 |
| | | | (NOx removal ratio after the 1st stage) | (74) | (85) | (88) | (88) | (86) |
| Example 6 | — | 300 | NOx | 81 | 88 | 91 | 89 | 71 |
| | | | CO | 43 | 73 | 92 | 98 | 100 |
| Example 25 | — | 450 | NOx | 90 | 94 | 95 | 94 | 76 |
| | | | CO | 56 | 85 | 84 | 99 | 100 |
| Comparative Example 3 | 300 | — | NOx | 81 | 91 | 93 | 93 | 92 |
| | | | CO | 0 | 0 | 0 | 0 | 0 |
| Comparative Example 4 | 450 | — | NOx | 90 | 94 | 97 | 97 | 95 |
| | | | CO | 0 | 0 | 0 | 0 | 0 |

TABLE 4

| | Composition of the catalyst (weight ratio) | | | Reaction temperature (°C.) | | | | |
|---|---|---|---|---|---|---|---|---|
| Example | NOx removing catalyst (1st stage) | CO—NOx removing catalyst (2nd stage) | Removal Efficiency (%) | 250 | 300 | 350 | 400 | 450 |
| 26 | TS-1:$V_2O_5$:$WO_3$ = 90:5:5 | TS-1:CuO:$V_2O_5$ = 96:2:2 | NOx | 76 | 85 | 92 | 92 | 90 |
| | | | Co | 16 | 30 | 48 | 64 | 71 |
| 27 | TS-1:$V_2O_5$:$WO_3$ = 90:5:5 | TS-1:CuO:$WO_3$ = 91:2:7 | NOx | 70 | 81 | 91 | 92 | 91 |
| | | | Co | 16 | 29 | 47 | 64 | 71 |
| 28 | TS-1:$V_2O_5$:$WO_3$ = 90:5:5 | TS-1:$Cr_2O_3$:$V_2O_5$ = 91:2:7 | NOx | 77 | 86 | 92 | 92 | 90 |
| | | | Co | — | 10 | 23 | 43 | 55 |
| 29 | TS-1:$V_2O_5$:$WO_3$ = 90:5:5 | TS-1:$MnO_2$:$V_2O_5$ = 91:2:7 | NOx | 80 | 92 | 95 | 94 | 92 |
| | | | Co | — | 6 | 21 | 38 | 41 |
| 30 | TS-1:$V_2O_5$:$WO_3$ = 91:2:7 | TS-1:CuO:$V_2O_5$:$WO_3$ = 86:2:7:5 | NOx | 83 | 92 | 95 | 94 | 87 |
| | | | Co | 26 | 50 | 75 | 90 | 92 |
| 31 | TS-1:$V_2O_5$:$MoO_3$ = 90:3:7 | TS-1:CuO:$V_2O_5$ = 96:2:2 | NOx | 74 | 84 | 92 | 92 | 91 |
| | | | Co | 16 | 31 | 48 | 65 | 72 | are shown in Table 3.

COMPARATIVE EXAMPLES 3–4

Two NOx removing catalyst (5×5 cells (25 mm square), length 150 mm) used in Example 21 were arranged in series, and by the same method as in Example 21, NOx and CO removal efficiencies were determined. The results are shown in Table 3.

According to the exhaust gas cleaning method of this invention using a combination of an NOx removing catalyst and a CO-NOx removing catalyst, CO can be removed efficiently and at the same time, an especially superior NOx removing ability is obtained at relatively high temperatures of 350° to 450° C. (by comparing Examples 1 to 23 with Example 6 and Comparative Example 3, and Example 24 with Example 25 and Comparative Example 4).

What is claimed is:

1. A method of removing nitrogen oxides and carbon monoxide simultaneously from an exhaust gas containing 10 to 1,000 ppm of nitrogen oxides, 10 to 10,000 ppm of carbon monoxide, 0 to 1,000 ppm of sulfur oxides, 1 to 20% by volume of oxygen, 1 to 15% by volume of carbon dioxide gas, 5 to 20% by volume of steam and 0 to 20 g/$Nm^3$ of soot which comprises passing the exhaust gas together with ammonia over a first stage NOx removing catalyst consisting of (a) 50 to 99.5% by weight of a catalytic oxide composed of a titanium-containing oxide and (b) 0.5 to 50% by weight of a catalytic oxide composed of at least one metal oxide selected from the group consisting of oxides of vanadium, tungsten, molybdenum and tin at a temperature of 200° to 500° C., and then passing the exhaust gas over a second stage catalyst consisting of (A) 60 to 99.9% by weight of a catalytic oxide composed of a titanium containing oxide, (B) 0.1 to 20% by weight of a catalytic oxide composed of at least one metal oxide selected from the group consisting of oxides of copper, manganese and chromium and (C) 0 to 20% by weight of a catalytic oxide composed of at least one metal oxide selected from the group consisting of oxides of vanadium, tungsten, molybdenum, cerium and tin at a temperature of 200° to 500° C., thereby removing nitrogen oxides and carbon monoxide simultaneously from the exhaust gas.

2. The method of claim 1 wherein the second stage NOx-CO catalyst comprises (A) 70 to 99.5% by weight of a catalytic oxide composed of a titanium-containing oxide, (B) 0.5 to 15% by weight of a catalytic oxide composed of at least one metal oxide selected from the group consisting of oxides of copper, manganese and chromium, and (C) 0 to 15% by weight of a catalytic oxide composed of at least one metal oxide selected from the group consisting of oxides of vanadium, tungsten, molybdenum, cerium and tin.

3. The method of claim 1 wherein the NOx removing catalyst consists of (a) 60 to 99% by weight of a catalytic oxide composed of a titanium-containing oxide and (b) 1 to 40% by weight of a catalytic oxide composed of at least one metal oxide selected from the group consisting of oxides of vanadium, tungsten, molybdenum and tin.

4. The method of claim 1 wherein the catalytic oxide (A) has a specific surface area of at least 5 $m^2/g$.

5. The method of claim 1, wherein the first stage reaction is carried out at a temperature of 250° to 450° C.

6. The method of claim 1 wherein the first stage reaction and the second stage reaction are carried out at 250° to 450° C.

7. The method of claim 1 wherein the catalytic oxide (B) is composed of an oxide of copper.

8. The method of claim 1 wherein the catalytic oxide (A) and the catalytic oxide (a) are, independently, selected from the group consisting of $TiO_2$, $TiO_2$—$SiO_2$ and $TiO_2$—$SiO_2$—$ZrO_2$.

9. The method of claim 1 wherein the catalytic oxide (A) and the catalytic oxide (a) are, independently, selected from the group consisting of $TiO_2$—$SiO_2$ and $TiO_2$—$SiO_2$—$ZrO_2$.

10. The method of claim 1 wherein said first stage NOx removing catalyst and said second stage NOx-CO removing catalyst are deposited on a honeycomb shaped carrier.

* * * * *